(12) United States Patent
Arbesman (10) Patent No.: US 9,856,938 B2
(45) Date of Patent: Jan. 2, 2018

(54) MATERIAL WITH VARIABLE HEIGHT BARBS

(71) Applicant: R.A. Investment Management S.A.R.L., Luxembourg (LU)

(72) Inventor: Ray Arbesman, Toronto (CA)

(73) Assignee: R.A. Investment Management S.A.R.L., Luxembourg (LU)

( * ) Notice: Subject to any disclaimer, the term of this patent is extended or adjusted under 35 U.S.C. 154(b) by 0 days.

(21) Appl. No.: 14/863,977

(22) Filed: Sep. 24, 2015

(65) Prior Publication Data

US 2016/0091043 A1  Mar. 31, 2016

Related U.S. Application Data

(63) Continuation-in-part of application No. 14/590,444, filed on Jan. 6, 2015, now abandoned.

(30) Foreign Application Priority Data

Sep. 26, 2014 (CA) ...................................... 2865386

(51) Int. Cl.
| | | |
|---|---|---|
| *F16D 69/04* | (2006.01) | |
| *F16D 65/092* | (2006.01) | |
| *B21J 5/12* | (2006.01) | |

(52) U.S. Cl.
CPC ................ *F16D 69/04* (2013.01); *B21J 5/12* (2013.01); *F16D 65/092* (2013.01); *F16D 2069/0441* (2013.01); *F16D 2069/0491* (2013.01)

(58) Field of Classification Search
CPC ..... F16D 2069/0441; F16D 2069/0491; F16D 69/04

USPC ................................ 188/250 F, 250 G, 250 B
See application file for complete search history.

(56) References Cited

U.S. PATENT DOCUMENTS

| | | |
|---|---|---|
| 1,897,088 A | 2/1933 | Victor |
| 1,915,221 A | 6/1933 | Fitzgerald |
| 2,171,530 A | 9/1939 | Balfe |
| 2,255,268 A | 9/1941 | Perrine |
| 3,092,532 A | 6/1963 | Swick et al. |
| 3,170,354 A | 2/1965 | Scholl |

(Continued)

FOREIGN PATENT DOCUMENTS

| | | |
|---|---|---|
| CA | 1330521 C | 7/1994 |
| CA | 1337622 C | 11/1995 |

(Continued)

OTHER PUBLICATIONS

Tanged Metal Reinforced Graphite Gasket Datasheet, Ningbo Sunwell Fluid Technologies CO., LTD., 2010.

(Continued)

*Primary Examiner* — Thomas Irvin
(74) *Attorney, Agent, or Firm* — Kilpatrick Townsend & Stockton LLP (57) ABSTRACT

A workpiece includes a material with a face and a first plurality of barbs and a second plurality of barbs extending integrally from the face. Each barb has a height above the face. The barbs of the first plurality are at least 10% higher than the barbs of the second plurality. The first plurality of barbs includes at least 10% of the barbs on the face and the second plurality of the barbs includes at least 10% of the barbs on the face. The barbs of the second plurality of barbs are bent and pointed.

15 Claims, 3 Drawing Sheets

(56) References Cited

U.S. PATENT DOCUMENTS

| | | |
|---|---|---|
| 3,533,891 A | 10/1970 | Puyear |
| 3,551,232 A | 12/1970 | Thompson |
| 3,557,407 A | 1/1971 | Lemelson |
| 3,605,360 A | 9/1971 | Lindal |
| 3,615,994 A | 10/1971 | MacLaine et al. |
| 4,023,613 A | 5/1977 | Uebayasi et al. |
| 4,234,638 A | 11/1980 | Yamazoe et al. |
| 4,552,252 A | 11/1985 | Stahl |
| 4,569,424 A | 2/1986 | Taylor, Jr. |
| 4,640,390 A | 2/1987 | Saumweber et al. |
| 4,705,278 A | 11/1987 | Locacius et al. |
| 4,723,783 A | 2/1988 | Belter et al. |
| 4,776,602 A | 10/1988 | Gallo |
| 4,781,389 A | 11/1988 | Beyer et al. |
| 4,799,579 A | 1/1989 | Myers et al. |
| 4,815,172 A | 3/1989 | Ward |
| 4,911,972 A | 3/1990 | Mercuri |
| 4,939,818 A | 7/1990 | Hahn |
| 5,067,210 A | 11/1991 | Keyaki |
| 5,142,743 A | 9/1992 | Hahn |
| 5,143,184 A | 9/1992 | Snyder et al. |
| 5,172,920 A | 12/1992 | Schlenk |
| 5,362,074 A | 11/1994 | Gallo et al. |
| 5,376,410 A | 12/1994 | MacKelvie |
| 5,469,604 A | 11/1995 | Calmettes et al. |
| D374,609 S | 10/1996 | Akeno |
| D376,533 S | 12/1996 | Akeno |
| 5,611,122 A | 3/1997 | Torigoe et al. |
| 5,788,247 A | 8/1998 | Tensor |
| D400,427 S | 11/1998 | Okawa et al. |
| 5,842,546 A | 12/1998 | Biswas |
| D425,405 S | 5/2000 | Naohara et al. |
| 6,247,704 B1 | 6/2001 | Battistoni |
| 6,258,457 B1 | 7/2001 | Ottinger et al. |
| 6,276,045 B1 | 8/2001 | Büchi et al. |
| 6,279,222 B1 | 8/2001 | Bunker et al. |
| 6,431,331 B1 | 8/2002 | Arbesman |
| 6,464,047 B1 | 10/2002 | Arbesman |
| 6,622,346 B2 | 9/2003 | Graham et al. |
| 6,671,935 B2 | 1/2004 | Filion et al. |
| 6,843,095 B2 | 1/2005 | Arbesman |
| 6,860,368 B2 | 3/2005 | Kulis, Jr. et al. |
| 6,910,255 B2 | 6/2005 | Arbesman |
| 6,913,673 B2 | 7/2005 | Baggot et al. |
| 7,048,097 B2 | 5/2006 | Arbesman |
| 7,222,701 B2 | 5/2007 | Pham |
| 7,320,386 B2 | 1/2008 | Kulis, Jr. et al. |
| 7,686,142 B2 | 3/2010 | Jung |
| 7,841,052 B2 | 11/2010 | Ducauchuis |
| 7,989,049 B2 | 8/2011 | Potier |
| 8,048,507 B2 | 11/2011 | Townsend et al. |
| 8,088,316 B2 | 1/2012 | Muth et al. |
| D654,355 S | 2/2012 | Cheng |
| 8,407,864 B2 | 4/2013 | Mask et al. |
| 8,683,840 B2 | 4/2014 | Tuma et al. |
| 8,685,520 B2 | 4/2014 | Meyer et al. |
| 9,273,741 B1 | 3/2016 | Arbesman et al. |
| 2002/0169435 A1 | 11/2002 | Neeb et al. |
| 2002/0170789 A1 | 11/2002 | Poelemans |
| 2004/0016608 A1 | 1/2004 | Gutowski |
| 2004/0140165 A1 | 7/2004 | Pham |
| 2005/0170157 A1 | 8/2005 | Armela et al. |
| 2006/0027427 A1 | 2/2006 | Anda et al. |
| 2006/0243017 A1 | 11/2006 | Jung et al. |
| 2006/0246256 A1 | 11/2006 | Ausen et al. |
| 2008/0003401 A1 | 1/2008 | Barnes et al. |
| 2009/0223753 A1 | 9/2009 | Kappagantu et al. |
| 2010/0170758 A1 | 7/2010 | Chen |
| 2010/0207334 A1 | 8/2010 | Virgin et al. |
| 2011/0051724 A1 | 3/2011 | Scott et al. |
| 2011/0079065 A1 | 4/2011 | Cabanski et al. |
| 2011/0233875 A1 | 9/2011 | Shaver et al. |
| 2011/0260371 A1 | 10/2011 | Arora et al. |
| 2012/0003462 A1 | 1/2012 | Wong |
| 2012/0006959 A1 | 1/2012 | Braun et al. |
| 2013/0152654 A1 | 6/2013 | Arbesman et al. |
| 2015/0024231 A1 | 1/2015 | Kutsumizu et al. |
| 2015/0053517 A1 | 2/2015 | Arbesman et al. |
| 2015/0086750 A1 | 3/2015 | Arbesman et al. |
| 2015/0099093 A1 | 4/2015 | Arbesman et al. |
| 2015/0140255 A1 | 5/2015 | MacKelvie |
| 2016/0023311 A1 | 1/2016 | Arbesman |
| 2016/0091041 A1 | 3/2016 | Arbesman |

FOREIGN PATENT DOCUMENTS

| | | |
|---|---|---|
| CA | 2127339 A1 | 1/1996 |
| CA | 2272115 A1 | 11/1999 |
| CA | 2300401 A1 | 12/1999 |
| CA | 2391183 A1 | 12/2003 |
| CA | 2760923 A1 | 6/2013 |
| CA | 2778455 A1 | 11/2013 |
| CA | 145893 S | 12/2013 |
| CA | 2798303 A1 * | 6/2014 |
| CA | 2821897 A1 | 1/2015 |
| CN | 102272471 A | 12/2011 |
| DE | 19754740 A1 | 3/1999 |
| DE | 102004048464 A1 | 4/2006 |
| DE | 102006015100 A1 | 10/2007 |
| DE | 102006015145 A1 | 10/2007 |
| DE | 102006015148 A1 | 10/2007 |
| EP | 0859163 A1 | 8/1998 |
| EP | 0934820 A2 | 8/1999 |
| EP | 1484524 A1 | 12/2004 |
| GB | 2125126 A | 2/1984 |
| GB | 2359186 A | 8/2001 |
| GB | 2507128 A | 4/2014 |
| JP | 59174431 U | 11/1984 |
| JP | 8021462 A | 1/1996 |
| JP | 2013012626 A | 1/2013 |
| JP | 2013089799 A | 5/2013 |
| WO | 02090792 A1 | 11/2002 |
| WO | 2011/051724 A2 | 5/2011 |
| WO | 2013/177667 A1 | 12/2013 |
| WO | 2014087236 A1 | 6/2014 |
| WO | 2015/010183 A1 | 1/2015 |

OTHER PUBLICATIONS

Tanged Graphite Datasheet, Alba Gaskets.
Graphite Sheet with Tanged Metal Datasheet, Cixi Cazseal Packing & Gasket Co., Ltd.
Supagraf Expanded Graphite Jointings Datasheet, James Walker & CO.
SLT-20 Tang Sheet Specifications Datasheet, Dynoteq Kft.
Tanged Stainless Steel Reinforced Graphite Sheet Datasheet, Gee Graphite.
Specification Sheet: SPG7003, SPG Gaskets Co.
Graphite Sheet Gaskets, Environmental Gasket Company LTD., 2009.
U.S. Appl. No. 14/590,444, "Advisory Action", Nov. 30, 2015, 2 pages.
U.S. Appl. No. 14/590,444, "Final Office Action", May 26, 2016, 10 pages.
U.S. Appl. No. 14/590,444, "Final Office Action", Sep. 22, 2015, 9 pages.
U.S. Appl. No. 14/590,444, "Non-Final Office Action", Apr. 3, 2015, 8 pages.
U.S. Appl. No. 14/590,444, "Non-Final Office Action", Dec. 30, 2015, 7 pages.
U.S. Appl. No. 14/590,444, "Restriction Requirement", Mar. 5, 2015, 5 pages.
EP15186839.5, "Extended European Search Report", Feb. 24, 2016.

* cited by examiner

MATERIAL WITH VARIABLE HEIGHT BARBS

CROSS REFERENCES TO RELATED APPLICATIONS

This application is a continuation-in-part of U.S. patent application Ser. No. 14/590,444, filed on Jan. 6, 2015, which claims priority from Canadian patent application no. 2,865,386, filed on Sep. 26, 2014, both of which are incorporated herein by reference in their entirety.

FIELD

The specification relates generally to textured material, and more particularly to textured material such as sheet metal with barbs extending from a face of the material.

BACKGROUND

U.S. patent application publication no. 2004/0016608 (Gutowski et al.) purports to disclose a brake backing plate that has a friction surface for receiving a friction pad material. The brake backing plate has multiple protrusions protruding out of the friction surface. One or more protrusions have an enlarged section for facilitating engagement between the friction surface and the friction pad material. In an embodiment, the enlarged section is formed by pressing the distal end of one or more protrusions.

SUMMARY

The following summary is intended to introduce the reader to various aspects of the specification, but not to define or delimit any invention.

In some aspects, a differentially textured workpiece includes a workpiece made of a ductile material with a substantially flat face. Multiple rows of integral raised barbs are on the flat face. A first group of the barbs are at least 10% higher, relative to the substantially flat face, than a second group of barbs. The first group of barbs includes at least 10% of the barbs, and the second group of barbs includes at least 10% of the barbs.

The first group of barbs may include at least 25% of the barbs, and the second group of barbs may include at least 25% of the barbs.

The barbs may be curved. The barbs in the second group of barbs may be bent so that they are not straight and not deformed. Alternatively, the barbs in the second group of barbs may be deformed so that they have a flattened distal end.

The height variation of the barbs may form a regular pattern.

The ductile material may be steel, and the base workpiece may be a sheet of steel.

The base workpiece may be a disc brake backing plate, and the barbs may be configured to receive and retain friction material.

Each barb in the first group of the barbs may be at least 25% higher than each barb in the second group of barbs. Each barb in the first group of barbs may be at least 50% higher than each barb in the second group of barbs.

The first group of barbs may include at least 40% of the barbs, and the second group of barbs may also include at least 40% of the barbs. Also, each barb in the first group of barbs may be at least 25% higher than each barb in the second group of barbs.

In some aspects, a brake pad includes a differentially textured steel workpiece and a friction element. The steel workpiece is configured to be a disc brake backing plate and has a substantially flat face with rows of integral raised barbs. The heights of the barbs above the substantially flat face vary substantially. The friction material is adhered to the textured face of the differentially textured workpiece to form a brake pad. A first group of barbs are at least 10% higher than a second group of barbs, the first group of barbs includes at least 10% of the barbs, and the second group of barbs includes at least 10% of the barbs.

In some aspects, a method of making a differentially textured workpiece is applied to a base workpiece made of ductile material having a flat face. The flat face of the base workpiece is first textured with rows of integral raised barbs having substantially the same height relative to the flat face. Then, a second group of barbs is reshaped to substantially reduce the height of each barb in the second group of barbs relative to each barb in a first group of barbs.

In this method, the reshaping may be done so that the height variation of the barbs forms a regular pattern.

The step of texturing the flat face of the base workpiece may involve gouging or planing the flat face of the base workpiece with a plurality of toothed blades so that each blade creates a row of raised barbs on the flat face of the base workpiece to texture the base workpiece. The toothed blades may have cutting tip geometries configured to cut grooves in the flat face of substantially the same length, thereby creating barbs of substantially the same height.

In this method, the barbs formed by texturing the flat face of the base workpiece may be curved. The barbs in the second group of barbs may be bent so that they are not straight and not deformed. Alternatively, the barbs in the second group of barbs may be deformed so that they each have a flattened distal end.

The step of reshaping the second group of barbs may be performed by passing a lobed roller over the textured face, thereby causing the lobes to bend each barb in the second group of barbs substantially more than any barbs in the first group of barbs are bent. It may be the case that none of the barbs in the first group of barbs are bent (or deformed) by the lobed roller.

The step of reshaping the second group of barbs may be performed by pressing the second group of barbs downward using a fluted plate in a stamping press to reduce the height of each barb in the second group of barbs.

In this method, the ductile material may be steel. The base workpiece may be a sheet of steel, and the barbs may be configured to receive and retain friction material.

In this method, the base workpiece may be a disc brake backing plate.

In this method, at least 25% of the barbs may be included in the second group of barbs and those barbs may each be at least 10% lower than each of the barbs in the first plurality of barbs. At least 25% of the barbs may be included in the second group of barbs and those barbs may each be at least 25% lower than each of the barbs in the first plurality of barbs.

In this method, the base workpiece may be configured to be a disc brake backing plate and the barbs may be configured to receive and retain friction material.

In some aspects, a method of making a differentially textured workpiece is applied to a base workpiece made of ductile material having a flat face. The flat face of the base workpiece is first gouged or planed with a plurality of toothed blades, each knife cutting the face to create a row of raised barbs thereby texturing the workpiece. The toothed blades have different cutting tip geometries configured to cut grooves in the substantially flat face of varying lengths thereby creating barbs of varying heights. In this method, at least 25% of the barbs may be included in the second group of barbs and those barbs may each be at least 10% lower than each of the barbs in the first plurality of barbs. The blades may be configured to cause the height variation of the barbs to form a regular pattern.

In some aspects, a workpiece comprises a material with a face and a first plurality of barbs and a second plurality of barbs extending integrally from the face. Each barb has a height above the face. The barbs of the first plurality are at least 10% higher than the barbs of the second plurality. The first plurality of barbs includes at least 10% of the barbs on the face and the second plurality of the barbs includes at least 10% of the barbs on the face. The barbs of the second plurality of barbs are bent and pointed.

The first plurality may include at least 25% of the barbs on the face, and the second plurality of the barbs may include at least 25% of the barbs on the face.

The barbs of the first plurality may be hook-shaped or curved.

The height variation of the barbs may form a regular pattern.

The material may be steel.

The workpiece may be a disc brake backing plate, and the barbs maybe configured to receive and retain friction material.

Each barb in the first plurality of barbs may be at least 25% higher than each barb in the second plurality of barbs, or at least 50% higher than each barb in the second plurality of barbs.

The first plurality of barbs may include at least 40% of the barbs on the face, and the second plurality of barbs may include at least 40% of the barbs on the face.

Each barb in the first plurality of barbs may be at least 25% higher than each barb in the second plurality of barbs.

According to some aspects, a brake pad comprises a disc brake backing plate comprising a steel workpiece. The steel workpiece has a face and a first plurality of barbs and a second plurality of barbs extending integrally from the face. Each barb has a height above the face. The height of the barbs of the first plurality is greater than the height of the barbs of the second plurality. The barbs of the second plurality are bent and pointed. A friction element is secured to the steel workpiece via the barbs.

The barbs of the first plurality may be at least 10% higher than the barbs of the second plurality. The first plurality of barbs may include at least 10% of the barbs on the face, and the second plurality of barbs may include at least 10% of the barbs on the face.

According to some aspects, a method of making a workpiece comprises the steps of: (a) texturizing a face of a base workpiece to create a first plurality and a second plurality of integrally raised barbs, the barbs all having substantially the same height relative to the face, and the barbs being bent and pointed; (b) reshaping the barbs of the second plurality to substantially reduce a height of each barb of the second plurality relative to each barb in the first plurality; and c) while reshaping the barbs of the second plurality, maintaining the barbs of the second plurality as bent and pointed.

The reshaping may be done so that a height variation of the barbs forms a regular pattern.

The step of texturizing the face of the base workpiece may comprise gouging the face of the base workpiece with a plurality of toothed blades. Each blade may create a row of the barbs on the face of the base workpiece to texturize the base workpiece. Each blade may have the same cutting tooth geometry.

The step of reshaping the barbs of the second plurality may comprise passing a lobed roller over the barbs. The lobes may bend each barb of the second plurality substantially more than any barbs in the first plurality of barbs are bent.

The lobed roller may comprise at least one lobe having a V-shaped outer portion. The V-shaped outer portion may bend barbs in adjacent rows in opposite directions, thereby reducing their heights.

In some examples, none of the barbs in the first plurality are bent or deformed by the lobed roller.

The step of reshaping the barbs of the second plurality may comprise pressing the barbs of the second plurality downward using a fluted plate in a stamping press to reduce the height of each barb in the second plurality.

The base workpiece may be a base disc brake backing plate. The barbs may be configured to receive and retain friction material.

The second plurality of barbs may include at least 25% of the barbs of the face, and the barbs of the second plurality may be at least 10% shorter than the barbs of the first plurality.

According to some aspects, a method of making a workpiece comprises the steps of: (a) gouging a face of a base workpiece of a material with a first tooth of a first geometry to create a first barb having a first height above the face; and b) gouging the face with a second tooth of a second geometry to create a second barb having a second height above the face that is less than the first height.

The method may further comprise repeating steps a) and b) to create a plurality of first barbs and a plurality of second barbs. The plurality of second barbs may include at least 25% of a total number of barbs on the face, and the barbs of the plurality of second barbs may each be at least 10% lower than the barbs of the plurality of first barbs.

The method may further comprise repeating steps a) and b) to create a plurality of first barbs and a plurality of second barbs in a regular pattern.

The second barb may be bent and pointed.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Barbs are structures that may be added to a face of a material, such as a ductile material. Barbs may be added for example by using one or more blades with multiple teeth, whereby the teeth gouge (or cut or plane or impact) the face of the ductile material, cutting to a shallow depth and for a short distance. In this way, a short, shallow (non-piercing) tapered groove is ploughed, resulting in an un-severed projection (the barb) being raised at the end of each groove. Such barbs may be formed on a flat face of a base workpiece, such as on one side of a sheet of steel. One or more of the blades may travel in an opposite direction with respect to another of the blades, to create barbs that point in opposite directions.

The terms "face" and "flat face" are intended to describe a face of the material both before and after the integral barbs have been raised.

The term "base workpiece" as used herein refers a piece of material, such as sheet of ductile metal (e.g. steel), which is used to form a textured workpiece. A base workpiece may in some examples be a base disc brake backing plate, and a textured workpiece may be a textured disc brake backing plate. Disc brake backing plates may also be referred to herein as "backing plates" or "plates"

The term "barb" as used herein refers to any protrusion or projection, such as a nail-like or pin-like structure, or curved or hooked or otherwise bent structure, raised from a face of a workpiece. A barb may be raised from a face of a workpiece for example by carving, gouging, planing or scraping its surface, such as is described in Canadian patent numbers 1,330,521, 1,337,622, and 2,127,339, which are incorporated herein by reference.

Barbs may be straight and substantially perpendicular to the face from which they are raised, or may be curved or hooked or otherwise bent to varying degrees. By "bent" it is meant that the barb is not straight. In some examples, bent barbs may be used in making disc brake backing plates, to help retain the friction element (which is made of friction material). In other examples, relatively straight barbs extending substantially perpendicularly from the face of the workpiece may be used, for example where a hard solid material is to be attached to the textured face, to facilitate the barbs piercing into the hard material. In some examples, the barbs may be angled relative to the face of the workpiece while still being straight. Barbs may be sharp and pointed, or blunt.

As mentioned above, in disc brake backing plates, barbs on a textured face of the plate may be used to retain the friction element. Friction powder may be moulded onto the plate by compression and heated until cured to form a friction element (or friction pad). The barbs in some examples may be curved or hook shaped or otherwise bent, so that portions of each barb are above the friction material when it hardens, thereby helping to retain the friction material on the backing plate ("above" being in the context of the substantially flat textured face of the plate being horizontal with the textured face facing upward).

Disclosed herein are disc brake backing plates having barbs that are used for attachment of friction material. The height of the barbs varies substantially on each plate, so that the plate includes at least a first plurality of barbs and a second plurality of barbs, where the barbs of the first plurality are higher than (i.e. have a greater height than) the barbs of the second plurality. It has been determined that when brake pads including such backing plates are subjected to sufficient shear force to fracture or cleave the hardened friction material from the plate, a planar fracture surface results, with an even layer of friction material remaining on the plate over the barbs. This indicates strong attachment of the friction element to the plate. In contrast, in brake pads in which the backing plates have barbs of generally equal height, when the brake pad is subjected to sufficient shear force to fracture or cleave the hardened friction material from the plate, a wavy fracture surface results. Some wave "troughs" descend into the barb zone, leaving patchy friction remnants and exposed barbs, indicating weaker attachment of the friction element.

The "height" of a barb is the perpendicular distance from the face of the textured workpiece to the point on the barb furthest from the face. For a substantially perpendicular and straight barb, the height of the barb is approximately equal to its length. In contrast, for a curved or hooked or otherwise bent barb, the height of the barb is less than its length. As used herein, the term "taller" is interchangeable with the term "higher", and both refer to a barb having a relatively large height. The term "lower" refers to a barb having a relatively smaller height. Furthermore, the terms "long" and "short" refer to the length of a barb, and not its height.

By "vary substantially", it is meant that the tallest or highest barbs (e.g. the barbs of the first plurality of barbs) are higher than the lowest barbs (e.g. the barbs of the second plurality of barbs) by a substantial height differential percentage, such as at least 10%. In some examples, the tallest barbs are higher than the lowest barbs by a height differential percentage of 20%, 30%, 40%, 50%, 75% to 100%, or more. In some particular examples, the tallest barbs are 100% higher than the lowest barbs. For example, the barbs of the first plurality may have a height of 2.5 mm, and the barbs of the second plurality may have a height of 1.25 mm.

In some examples, a substantial percentage of the barbs exhibits such height differentials, so that, for example, the heights of a certain percentage of the barbs on the face exceed the heights of another certain percentage (or that same percentage) of the barbs on the face by at least a substantial height differential percentage. In other words, the first plurality of the barbs may include a certain percentage of the barbs of the face, and the second plurality of the barbs may include another certain percentage of the barbs on the face. The percentage of the barbs that are in the first plurality may be, for example, 10%, 20%, 25%, 30%, 40%, 45%, 50%, or more than 50% of the barbs on the face. In some examples, 50% of the barbs may have a height that is about 50% to 100% greater than the height of the other 50% of the barbs. In some examples, the heights of all the barbs in the first plurality of barbs are equal, and the heights of all the barbs in the second plurality of barbs are equal.

In the example above, the substantial height differential percentage is equal to the percentage of barbs exhibiting that height differential. In alternative examples, the substantial height differential percentage may differ from the percentage of barbs exhibiting that height differential. For example, the substantial height differential percentage may be 10%, and 50% of the barbs may exhibit this height differential relative to the other 50%. In other examples, the substantial height differential percentage may be 20%, and 25% of the barbs may exhibit this height differential relative to the other 75% of the barbs, or with respect to only 50% or 25% of the other barbs.

In some examples, the taller barbs (e.g. the barbs of the first plurality of barbs) may protect the shorter barbs (e.g. the barbs of the second plurality) from damage during manufacturing, handling, tumble-washing, packaging and shipping. The protected barbs may retain their sharp-edged characteristics which may further help to retain the friction material.

One method of making such variable height barbs is by using toothed blades having different cutting tip geometries.

Tooth tips that are higher up on the blade will enter the plate later than lower tips resulting in longer grooves with longer and higher barbs and shorter grooves with shorter and lower barbs. In some examples, tips on one blade can be at different heights. In other examples, each blade can have tip heights different from other blades. Tip heights can also vary along the length of each blade.

Figure 12:
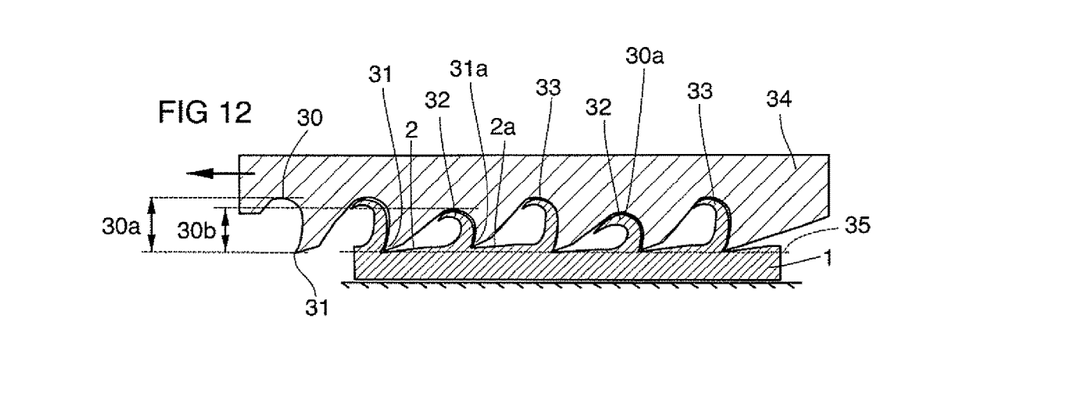
FIG. 12 is a cross sectional view showing a blade with alternating cutting tip geometries gouging barbs with differing heights from a plate.

FIG. 12 shows an example toothed blade 34 with alternating teeth 31, 31a, where half of the teeth 31 are longer, having a height 30a, and the other half of the teeth are shorter, having a smaller height 30b. The toothed blade 34 is shown in FIG. 12 gouging five barbs of alternating heights 30b, 30a. The height of each barb is constrained by the height of the tooth cutting it, so that the barbs 32 cut with the shorter teeth 31a have a lower height 30b, than those barbs 33 cut with the longer teeth 31, which have a greater height 30a. Between the cutting portions of the teeth 31, 31a, the blades are arcuate 30a so that each barb is formed with a bent shape.

In other examples, all the barbs may be initially made to have substantially the same height. For example, this may be done using toothed blades with cutting tip geometries configured to cut grooves in a face of a base workpiece of substantially the same lengths, thereby creating barbs of substantially the same heights. Some of the barbs (e.g. the barbs of the second plurality of barbs) may then be bent or deformed to a lower height. The bent or deformed barbs may also be referred to as "reshaped barbs". As used herein, the term "deforming" refers to reducing the length of the barb in order to reduce the height of the barb. Deforming a barb may involve flattening or otherwise blunting a pointed tip of the barb. This is in contrast to bending, in which the height of the barb is reduced while still maintaining the length of the barb.

Figures 1, 2, 3:
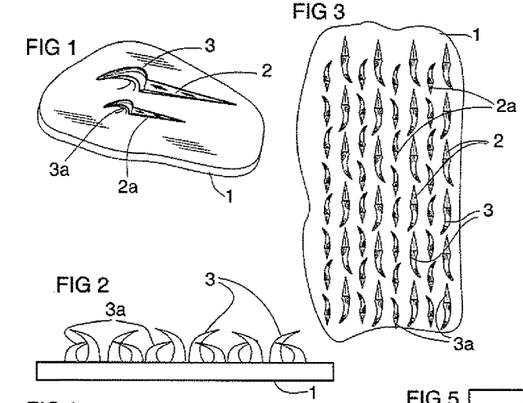
FIG. 1 is a perspective view of a portion of a workpiece with two representative pointed barbs of different heights that have been raised from grooves cut by the tip of a toothed blade, each barb being angled slightly to one side relative to the grooves.
FIG. 2 is an end view of another workpiece, showing a single row of barbs having varying heights, where some of the barbs are hooked to the left and some of the barbs are hooked to the right.
FIG. 3 is a top view of the workpiece of FIG. 1, showing grooves of different lengths and their respective barbs having varying heights.

In some examples, at least some of the reshaped barbs may be bent but still pointed, as shown for example, in FIGS. 1 and 2. In such examples, the reshaped barbs are not straight and are not deformed and remain pointed.

Referring now to FIG. 1, an example backing plate 1 has tapered grooves 2, 2a carved or ploughed into the face of plate 1 so as to raise unsevered (or integral) barbs 3, 3a. Barb 3 may also be referred to herein as a "first barb", and barb 3a may be referred to as a "second barb". Groove 2 is longer than groove 2a, resulting in a longer and taller (i.e. higher) barb 3 compared to barb 3a. Groove 2a is shorter resulting in a shorter and lower barb 3a. Barbs 3 and 3a have a hook or curled (i.e. bent) shape and are pointed, which can allow the powder friction material F (shown in FIGS. 7 and 8) to flow under the barbs, whereafter it cures hard and is not easily separated from the backing plate. The barbs 3, 3a in FIG. 1 are slightly angled to one side relative to the grooves 2, 2a.

Figure 10:
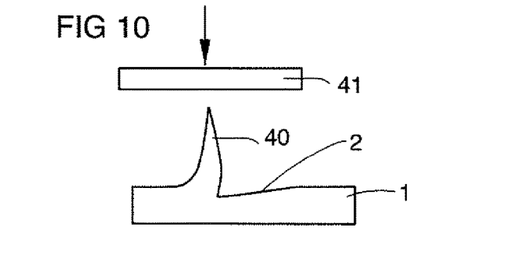
FIG. 10 is a side view showing a plate poised above a pointed barb.
Figures 10A, 11:
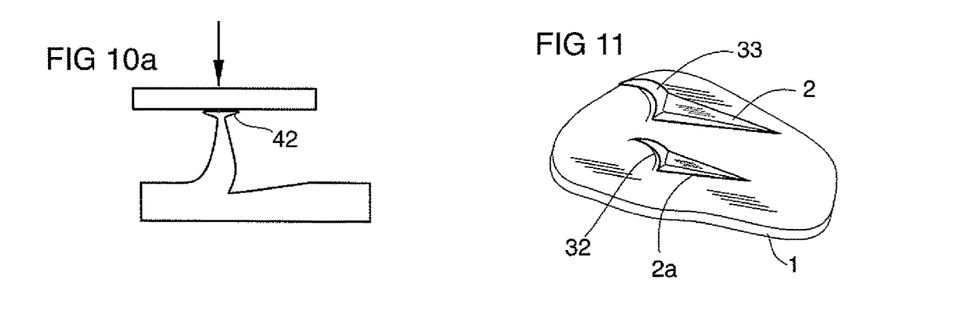
FIG. 10a is a side view showing the plate of FIG. 10 deforming the pointed barb of FIG. 10 to form a flattened head.
FIG. 11 is a perspective of a portion of another workpiece, with two representative pointed barbs of different heights that have been raised from grooves cut by the tip of a toothed blade.

Referring now to FIG. 11, an alternative backing plate 1 is shown. The backing plate has tapered grooves 2, 2a carved or ploughed into the face of plate 1 so as to raise unsevered barbs 32, 33. Groove 2a is shorter than groove 2, resulting in a shorter and lower barb 32. In this example, barbs 32 and 33 have a hook or curled (i.e. bent) shape, are pointed, and are raised straight ahead relative to the grooves.

Figure 2A:
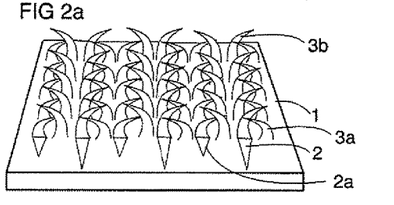
FIG. 2a is perspective view of the workpiece of FIG. 2, showing rows of barbs and the grooves from which they are raised.

Referring now to FIG. 2, an end view of a row of barbs 3, 3a rising from plate 1 is shown. In FIG. 2a, barbs 3, 3a are formed in rows on plate 1, with alternating rows of longer and taller barbs 3 and shorter and lower barbs 3a.

Referring now to FIG. 3, the row formation of the barbs 3, 3a is depicted. In this example, the barbs remain attached to the end of their respective grooves 2, 2a. Adjacent rows of barbs 3, 3a are created from opposite ends (from top, from bottom) and are made to curve or hook (i.e. bend) left and right. In this example, each different height of barb may be made by a different tool (e.g. having a different cutting tip geometry).

Figure 4:
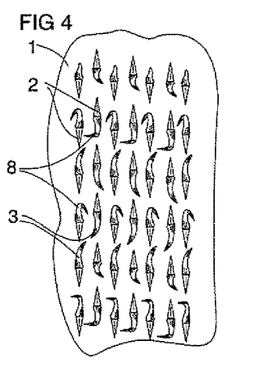
FIG. 4 is a top view of another workpiece, where all barbs were initially created to have the same height, after which some were clinched, bent or deformed to a lower height.

In an alternative example, shown in FIG. 4, equal height and equal length barbs are initially made from equal length grooves 2, all cut by a single tool (e.g. using toothed blades having similar cutting tip geometries). Some barbs (i.e. the barbs of the second plurality of barbs) are then bent or deformed to a lower height, and are designated herein as reshaped barbs 8. The taller (i.e. higher) and lower barbs are present on the same plate 1, all made initially with a tool of a single design.

Figure 5:
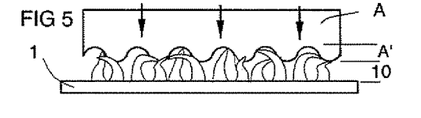
FIG. 5 is a schematic end view, showing how the height of some barbs can be modified by the use of a fluted plate that is pressed down on the barbs.

Referring to FIG. 5, an example method is shown for reshaping barbs 3 into reshaped barbs 8 in a stamping press with fluted plate A, having grooves with a depth A'. The plate A can be used angularly across the rows of barbs to create a random pattern of barbs 3 and reshaped barbs 8. Flutes milled at different angles and lengths can also be used to randomize barb shapes. Such a fluted plate may reduce the heights of a subset or even all of the barbs, but can result in a significant percentage of the reshaped barbs (e.g. a second plurality of the barbs) having heights that are significantly less than another significant percentage of the reshaped barbs (e.g. a first plurality of the barbs), even if the heights of all the barbs are reduced to some degree.

Figure 6:
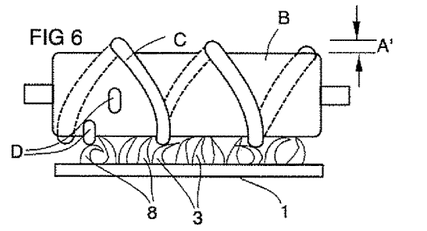
FIG. 6 is another schematic end view, showing how the height of some barbs can be modified by the use of a lobed roller that contacts only some barbs and deforms or reshapes them by pressing them down.
Figure 6A:
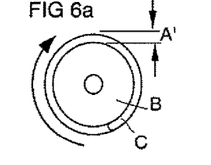
FIG. 6a is a side view of the roller of FIG. 6.

Referring to FIGS. 6 and 6a, an example method is shown for reshaping barbs with a roller B having raised lobes C. FIG. 6a shows an end view of the roller. FIG. 6 shows a front view with plate 1 having reshaped barbs 8 having passed beneath the roller B. Roller B has lobes C of height A'. The lobe C in this example has a spiral form so that randomly located barbs 3 are bent into reshaped barbs 8. Many other barb formers can be put onto rollers such as protrusions D.

Figure 6B:
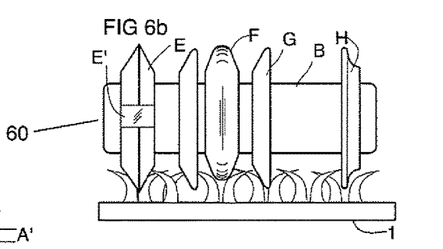
FIG. 6b is another schematic end view, showing how the height of some barbs can be modified by the use of a roller with variable shape lobes or rolls, including a V-shaped roll.

In another example, one or more rollers may employ one or more "V" shaped lobes arranged to travel between the rows of barbs, pushing them aside to bend them and create lower height barbs. Multiple lobes/rolls and spacers may be arranged so as to only bend alternate rows or selected rows. FIG. 6b shows an example method of reshaping barbs using such a roller 60 with shaped lobes that are spaced apart on a drive shaft B in accordance with the spacing of rows of barbs so as to bend some of the barbs them aside (to the left and/or right) thereby lowering their height. The barbs are initially hooked or curved or otherwise bent so that they have substantially the same height as each other. Lobes E, F, G, and H are spaced and shaped with single or double-sided bevels and/or radiuses. For example lobe E has a V-shaped bending portion.

As the barbs pass under the lobes, those barbs that are contacted by the lobes are spread apart by bending them to either side, which lowers their height below the height of the untouched rows of barbs. In the example shown, lobe E also has a circumferential gap E' so that it will only bend some barbs. Various combinations of shapes of lobes and spacing between lobes may be employed in forming different rollers.

Figure 9:
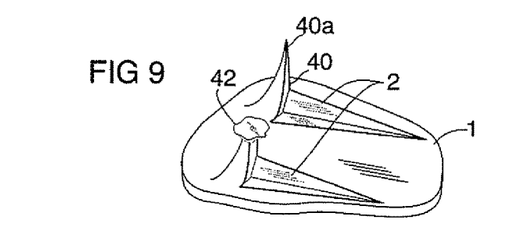
FIG. 9 is a perspective view of a portion of another workpiece, with one pointed barb and one deformed barb, which have different heights.

In another example, some of the barbs may be deformed to form a flattened head, similar to the head of a nail. FIG. 9 shows a portion of a disc brake backing plate 1 with one barb 40 having a pointed distal end 40a, and a second barb with a lower height having a flattened distal end 42 that is like the head of a nail. In this example, the barbs can be first formed by cutting or gouging the plate to form pointed barbs, all of substantially the same height, and optionally all substantially perpendicular to the face of the plate. Then some of the barbs (e.g. the second plurality of the barbs, which may include half of the barbs) are deformed to form the flattened distal end and lower the height of the deformed barbs relative to the undeformed barbs. This may be done as shown by way of example in FIGS. 10 and 10a, by pressing a plate 41 down on some of the pointed barbs 40, to create a flattened distal end 42.

Figure 7:
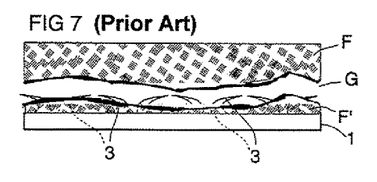
FIG. 7 is a schematic cross-sectional view, showing how brake friction material can break off a prior art backing plate when subjected to sufficient shear force, wherein the line of fracture is uneven and in some places descends below the barb tips, leaving them visible and thus providing indication of reduced retention at those locations.
Figure 8:
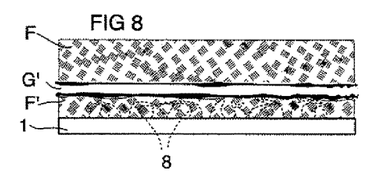
FIG. 8 is a schematic cross-sectional view showing how multi-height barbs modify the line of fracture to be above the barb tips which remain below the fracture line and thus provide indication that the friction element is retained more evenly across the entire plate surface.

FIGS. 7 and 8 show a disc brake pad that has been tested to failure by a shear force machine (not shown). Friction material F has fractured leaving complementary wavy surfaces on the upper and bottom portions. The fracture zone is depicted by the letter G. In FIG. 7 in which the barbs are all of the same height, barbs 3 are exposed in gap G with little friction remaining thereabout. A wavy, uneven layer of friction element F' remains attached to plate 1 but some wave troughs have descended into the barb zone.

In FIG. 8, in which the barbs are of variable heights (i.e. a first plurality of the barbs is higher than a second plurality of the barbs) the shearing fracture zone is more planar in form (not wavy), and the reshaped barbs 8 remain beneath the friction element F. This indicates strong retention of the friction element, which, in turn, may provide a safer disc brake pad.

Figure 13:
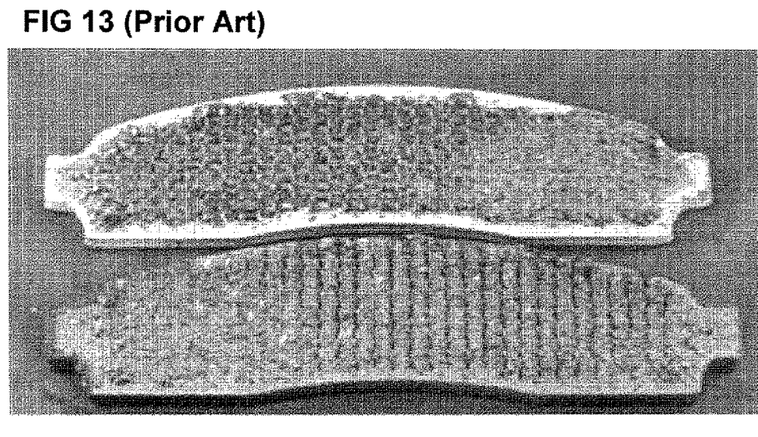
FIG. 13 is a photograph of two prior art backing plates that have had the friction pad sheared off, indicating areas of poor friction retention where the barbs are exposed.

Referring to FIG. 13, two actual disc brake pads that have been shear-broken are shown. The barbs of each disc brake pad are all of the same height. Clearly visible is the wavy shear zone and the exposed barbs, with little friction material remaining.

Figure 14:
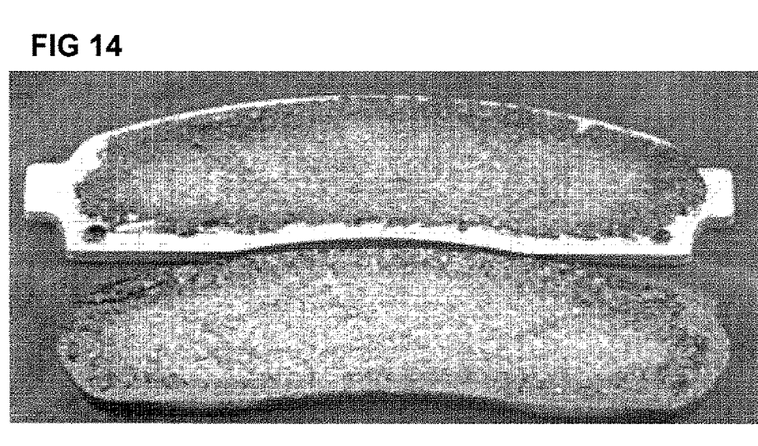
FIG. 14 is a photograph of a barbed plate having barbs of different heights, and a sheared off friction pad, where all the barbs remain fully below the fracture surface, demonstrating enhanced retention.

FIG. 14 is a photograph of disc brake pad having barbs of variable heights. Above is the plate and below is the sheared off friction pad. A smoother fracture zone can be seen. As well, no exposed barbs are visible. Rather, the barbs remain covered in friction material, demonstrating strong friction material retention. This test evaluation was carried out on numerous samples of brake pads and they all showed the same strong friction material retention.

Various materials can be used to create such differentially textured workpieces (i.e. workpieces having barbs of variable heights). In some examples, the material is ductile. In some examples, the workpieces are made from steel sheeting or stampings. In some examples, the workpieces are made from various harder plastics (Shore hardness of approximately D55 and up) and other materials in a range of widths and thicknesses. The workpiece can also be cooled or heated prior to texturizing in order to make it more ductile or otherwise amenable to the texturing operation. For example, soft and rubbery materials (including those below the suggested Shore hardness of D55) may be cooled or frozen to apply this process.

In some examples, the heights of the barbs form a regular pattern. For example all the barbs in every other row may be a first height, and all the barbs in the other rows may be a second height (for example 25% lower). The methods of forming the differentially textured material described above can produce such regular height variation patterns.

In some examples, rows of barbs on the face of a workpiece are formed substantially without gaps along the length of the workpiece, such as a sheet of steel. Various patterns, arrangements, densities and dimensions of barbs are possible. In some examples, each of the higher barbs (e.g. each barb of the first plurality of barbs) has a finished height of less than 2.5 mm (0.1 inches). The barb dimensions may be based on a tiered scale of barb grades for different applications, such as 1.8 mm (0.07 inches), 1.5 mm (0.06 inches), 1.15 mm (0.045 inches) and 0.75 mm (0.03 inches).

In some examples, each barb has a finished thickness at its base of less than 0.050", or less than 0.040".

In some examples, particularly where the workpiece is a sheet of steel, each of the higher barbs (e.g. the barbs of the first plurality of barbs) may have a finished height of between about 150% to about 300% of the thickness of the sheeting.

In some examples, the density of barbs on the sheeting is between approximately 30-200 barbs per square inch, such as approximately 6 barbs per square cm (40 barbs per square inch) for workpieces where the taller barbs are at least 1.5 mm (0.06 inches) high, 12 barbs per square cm (80 barbs per square inch) for workpieces where the taller barbs are at least 1.15 mm (0.045 inches) high, or 30 barbs per square cm (190 barbs per square inch) for workpieces where the taller barbs are at least 0.75 mm (0.03 inches) high. Nonetheless, a great variety of dimensions and geometries of barbs are possible. Further, the barbs need not be provided in precisely matching rows over the entire material, but may be formed in zones or patterns to suit a particular application.

The abbreviation mm as used herein refers to millimeters. The abbreviation cm as used herein refers to centimeters.

The invention claimed is:

1. A workpiece comprising:
    a material with a face and a first plurality of barbs and a second plurality of barbs extending integrally from the face, each barb having a height above the face;
    wherein the barbs of the first plurality are at least 10% higher than the barbs of the second plurality;
    wherein the first plurality of barbs includes at least 10% of the barbs on the face and the second plurality of barbs includes at least 10% of the barbs on the face;
    wherein at least a portion of the first plurality of barbs and a portion of the second plurality of barbs are arranged in rows on the workpiece, at least some of the rows including at least one of the first plurality of barbs and at least one of the second plurality of barbs; and
    wherein the barbs of the second plurality of barbs are bent and pointed and are not deformed.

2. The workpiece of claim 1, wherein the first plurality of barbs includes at least 25% of the barbs on the face, and the second plurality of barbs includes at least 25% of the barbs on the face.

3. The workpiece of claim 1, wherein the barbs of the first plurality are at least one of curved and hook-shaped.

4. The workpiece of claim 1, wherein the height variation of the barbs forms a regular pattern.

5. The workpiece of claim 1, wherein the material is steel.

6. The workpiece of claim 5, wherein the workpiece is a disc brake backing plate, and the barbs are configured to receive and retain friction material.

7. The workpiece of claim 1, wherein each barb in the first plurality of barbs is at least 25% higher than each barb in the second plurality of barbs.

8. The workpiece of claim 7, wherein each barb in the first plurality of barbs is at least 50% higher than each barb in the second plurality of barbs.

9. The workpiece of claim 1, wherein the first plurality of barbs includes at least 40% of the barbs on the face, and the second plurality of barbs includes at least 40% of the barbs on the face.

10. The workpiece of claim 9, wherein each barb in the first plurality of barbs is at least 25% higher than each barb in the second plurality of barbs.

11. A brake pad comprising:
    a) a disc brake backing plate comprising a steel workpiece, the steel workpiece having a face and a first plurality of barbs and a second plurality of barbs extending integrally from the face, each barb having a height above the face, wherein the height of the barbs of the first plurality is greater than the height of the barbs of the second plurality, wherein the barbs of the second plurality of barbs are bent and pointed and are not deformed, and wherein at least a portion of the first plurality of barbs and a portion of the second plurality of barbs are arranged in rows on the workpiece, at least some of the rows including at least one of the first plurality of barbs and at least one of the second plurality of barbs; and
    b) a friction element secured to the steel workpiece via the barbs.

12. The brake pad of claim 11, wherein the barbs of the first plurality are at least 10% higher than the barbs of the second plurality, and wherein the first plurality of barbs includes at least 10% of the barbs on the face, and the second plurality of barbs includes at least 10% of the barbs on the face.

13. A method of making a workpiece, the method comprising the steps of:
    (a) gouging a face of a base workpiece of a material with a first tooth of a first geometry to create a first barb having a first height above the face; and
    (b) gouging the face with a second tooth of a second geometry to create a second barb having a second height above the face that is less than the first height;
    (c) repeating steps a) and b) to create a plurality of the first barbs and a plurality of second barbs, and
    wherein at least a portion of the plurality of first barbs and a portion of the plurality of second barbs are arranged in rows in a direction of a gouge of the barbs, at least some of the rows including at least one of the first barbs and at least one of the second barbs; and
    wherein the barbs of the second plurality of barbs are bent and pointed and are not deformed.

14. The method of claim 13, wherein the plurality of second barbs includes at least 25% of a total number of barbs on the face and the barbs of the plurality of second barbs are each at least 10% lower than the barbs of the plurality of first barbs.

15. The method of claim 13, further comprising creating the plurality of first barbs and the plurality of second barbs in a regular pattern.

* * * * *